United States Patent
Wang et al.

(10) Patent No.: US 10,587,373 B1
(45) Date of Patent: Mar. 10, 2020

(54) CONTROLLING TRANSMISSION BASED ON ACKNOWLEDGEMENT DELAY

(71) Applicant: Sprint Spectrum L.P., Overland Park, KS (US)

(72) Inventors: Yu Wang, Fairfax, VA (US); Zheng Cai, Fairfax, VA (US); Zheng Fang, McLean, VA (US); Udit Thakore, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 196 days.

(21) Appl. No.: 15/373,238

(22) Filed: Dec. 8, 2016

(51) Int. Cl.
  *H04L 1/18* (2006.01)
  *H04L 5/14* (2006.01)
  *H04L 5/00* (2006.01)
  *H04L 12/875* (2013.01)

(52) U.S. Cl.
  CPC .......... *H04L 1/1887* (2013.01); *H04L 1/1812* (2013.01); *H04L 5/0055* (2013.01); *H04L 5/14* (2013.01); *H04L 47/56* (2013.01)

(58) Field of Classification Search
  CPC ... H04L 1/1887; H04L 1/1812; H04L 5/0055; H04L 5/14; H04L 43/0852; H04L 47/283; H04L 47/56
  See application file for complete search history.

(56) References Cited

U.S. PATENT DOCUMENTS

| | | | | |
|---|---|---|---|---|
| 9,629,066 B2 * | 4/2017 | Au | ........................ | H04W 48/00 |
| 2007/0064669 A1 * | 3/2007 | Classon | ................ | H04L 1/1822 |
| | | | | 370/347 |
| 2010/0061256 A1 * | 3/2010 | Ang | ........................ | H04W 16/14 |
| | | | | 370/252 |
| 2011/0149774 A1 * | 6/2011 | Chen | ..................... | H04L 1/1854 |
| | | | | 370/252 |
| 2011/0211503 A1 * | 9/2011 | Che | ........................ | H04L 5/0005 |
| | | | | 370/280 |
| 2012/0275429 A1 * | 11/2012 | Chin | ................... | H04W 74/085 |
| | | | | 370/331 |
| 2013/0028127 A1 * | 1/2013 | Zheng | ................. | H04L 43/0852 |
| | | | | 370/252 |

(Continued)

OTHER PUBLICATIONS

Minseok Kim, Sungbong Kim, and Yonghoon Lim; An Implementation of Downlink Asynchronous HARQ for LTE TDD System; Jan. 15-18, 2012; IEEE.*
3GPP, "3GPP TS 23.203 v11.3.0 3rd Generation Partnership Project; Technical Specification Group Services and System Aspects; Policy and charging control architecture (Release 11)", Sep. 2011, 3GPP, Version 11.3.0, pp. 35-38 (Year: 2011).*

(Continued)

*Primary Examiner* — Un C Cho
*Assistant Examiner* — Shah M Rahman

(57) ABSTRACT

A method and system to help minimize communication latency. When data is to be transmitted from a transmitting entity to a receiving entity, the transmission will be scheduled to occur in a time interval that selected based on a consideration of the delay-sensitivity of the data and based on a HARQ delay associated with the selected time interval. For instance, if the data is particularly delay-sensitive, then the transmission could be scheduled to occur in a time interval that is selected based on the time interval having a relatively low associated HARQ delay, so as to help reduce the overall delay of the communication. Whereas, if the data is not particularly delay-sensitive, then the transmission could be scheduled to occur in a time interval that has a relatively high associated HARQ delay.

20 Claims, 6 Drawing Sheets

(56) References Cited

U.S. PATENT DOCUMENTS

| | | | | |
|---|---|---|---|---|
| 2013/0242889 | A1* | 9/2013 | Khoryaev | H04W 72/0413 370/329 |
| 2014/0016594 | A1* | 1/2014 | Han | H04L 5/001 370/329 |
| 2014/0233439 | A1* | 8/2014 | Hong | H04W 72/1221 370/280 |
| 2015/0071267 | A1* | 3/2015 | Wu | H04W 52/50 370/336 |
| 2016/0044708 | A1* | 2/2016 | Lin | H04L 1/1861 370/280 |
| 2017/0331577 | A1* | 11/2017 | Parkvall | H04J 11/0079 |
| 2018/0035446 | A1* | 2/2018 | Li | H04L 5/14 |
| 2018/0076942 | A1* | 3/2018 | Nory | H04L 5/0055 |

OTHER PUBLICATIONS

ETSI, "LTE; Evolved Universal Terrestrial Radio Access (E-UTRA); Physical layer procedures (3GPP TS 36.213 version 9.1.0 Release 9)", Apr. 2010, ETSI, ETSI TS 136 213 V9.1.0, pp. 1-81 (Year: 2010).*

3GPP, "3rd Generation Partnership Project; Technical Specification Group Radio Access Network; Evolved Universal Terrestrial Radio Access (E-UTRA); Medium Access Control (MAC) protocol specification (Release 8)", Jun. 2010, 3GPP, 3GPP TS 36.321 V8.9.0, pp. 1-47 (Year: 2010).*

Afrin et al., "A Delay Sensitive LTE Uplink Packet Scheduler for M2M Traffic", 2013, IEEE, Globecomm 2013 Workshop, pp. 941-946, Total pp. 6 (Year: 2013).*

* cited by examiner

| TDD Configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Fig. 2

| Frame Configuration | TDD UL HARQ ACK/NACK Timing Gap K | | | | | | | | | | Avg. K (ms) |
|---|---|---|---|---|---|---|---|---|---|---|---|
| | Subframe Index | | | | | | | | | | |
| | 0 | 1 | 2 | 3 | 4 | 5 | 6 | 7 | 8 | 9 | |
| FC1 | 7 | 6 | - | - | 4 | 7 | 6 | - | - | 4 | 6 |
| FC2 | 7 | 6 | - | 4 | 8 | 7 | 6 | - | 4 | 8 | 7 |
| FC3 | 4 | 11 | - | - | - | 7 | 6 | 6 | 5 | 5 | 7 |
| FC4 | 12 | 11 | - | - | 8 | 7 | 7 | 6 | 5 | 4 | 8 |
| FC5 | 12 | 11 | - | 9 | 8 | 7 | 6 | 5 | 4 | 13 | 9 |

| Frame Configuration | One Way OTA Avg. Latency (ms) | | | | | | | | |
|---|---|---|---|---|---|---|---|---|---|
| | Max # of HARQ Re-transmissions | | | | | | | | |
| | 0 | 1 | 2 | 3 | 4 | 5 | 6 | 7 | 8 |
| FC1 | 10 | 20 | 30 | 40 | 50 | 60 | 70 | 80 | 90 |
| FC2 | 11 | 22 | 33 | 44 | 55 | 66 | 77 | 88 | 99 |
| FC3 | 11 | 22 | 33 | 44 | 55 | 66 | 77 | 88 | 99 |
| FC4 | 12 | 24 | 36 | 48 | 60 | 72 | 84 | 96 | 108 |
| FC5 | 13 | 26 | 39 | 52 | 65 | 78 | 91 | 104 | 117 |

Fig. 3

| Frame Configuration | TDD UL HARQ ACK/NACK Timing Gap K | | | | | | | | | | Avg. K (ms) | Avg. K (Reduced) (ms) | Avg. K Improvement |
|---|---|---|---|---|---|---|---|---|---|---|---|---|---|
| | Subframe Index | | | | | | | | | | | | |
| | 0 | 1 | 2 | 3 | 4 | 5 | 6 | 7 | 8 | 9 | | | |
| FC1 | 7̸ | 6 | - | - | 4 | 7̸ | 6 | - | - | 4 | 6 | 5 | 16.7% |
| FC2 | 7̸ | 6 | - | 4 | 8̸ | 7 | 6 | - | 4 | 8̸ | 7 | 6 | 14.3% |
| FC3 | 4 | 11̸ | - | - | - | 7 | 6 | 6 | 5 | 5 | 7 | 6 | 14.3% |
| FC4 | 12̸ | 11̸ | - | - | 8 | 7 | 7 | 6 | 5 | 4 | 8 | 7 | 12.5% |
| FC5 | 12̸ | 11̸ | - | 9 | 8 | 7 | 6 | 5 | 4 | 13 | 9 | 7 | 22.2% |

| Frame Configuration | One Way OTA Avg. Latency (ms) | | | | | | | | | | Latency Improvement |
|---|---|---|---|---|---|---|---|---|---|---|---|
| | Max # of HARQ Restransmissions | | | | | | | | | | |
| | 0 | 1 | 2 | 3 | 4 | 5 | 6 | 7 | 8 | | |
| FC1 | 9 | 18 | 27 | 36 | 45 | 54 | 63 | 72 | 81 | | 10.0% |
| FC2 | 10 | 20 | 30 | 40 | 50 | 60 | 70 | 80 | 90 | | 9.1% |
| FC3 | 10 | 20 | 30 | 40 | 50 | 60 | 70 | 80 | 90 | | 9.1% |
| FC4 | 11 | 22 | 33 | 44 | 55 | 66 | 77 | 88 | 99 | | 8.3% |
| FC5 | 11 | 22 | 33 | 44 | 55 | 66 | 77 | 88 | 99 | | 15.4% |

Fig. 4

CONTROLLING TRANSMISSION BASED ON ACKNOWLEDGEMENT DELAY

BACKGROUND

In some wireless communication systems, when data that is transmitted by a transmitting entity to a receiving entity is not received by the receiving entity, or is received by the receiving entity with one or more errors, the data may be re-transmitted. The re-transmission of data could occur either automatically or in response to feedback from the receiving entity. For example, a Hybrid Automatic Repeat Request (HARQ) procedure could be used. In the HARQ approach, after a transmitting entity has transmitted a block of data, the transmitting entity waits to receive a HARQ response from the receiving entity. If the transmitting entity receives a positive acknowledgement (ACK) as the HARQ response, then no re-transmission is needed and the transmitting entity can transmit additional data. If the transmitting entity receives a negative acknowledgement (NACK) as the HARQ response, then the transmitting entity re-transmits the data. The transmitting entity may also re-transmit the data if the transmitting entity does not receive any HARQ response within a certain period of time.

This re-transmission approach can allow data to be successfully transmitted from a transmitting entity to a receiving entity even when there is a substantial probability that the transmitted data will be received with one or more errors, for example, because of poor radio frequency (RF) conditions. Specifically, the data can be re-transmitted multiple times until the data is received without errors. Further, in some implementations, the transmitting entity could include forward-error-correction (FEC) bits with each transmission attempt, and the receiving entity could combine multiple such transmissions together to help successfully recover the intended transmission.

In a representative implementation of this process, the receiving entity may be configured to transmit a HARQ response to the transmitting entity at a defined time following the transmitting entity's transmission of the data. This time may be set so as to allow sufficient time for the receiving entity to process a received data transmission so as to determine whether the transmission is error free or whether re-transmission is necessary, and for transmission of a HARQ response to the transmitting entity. Further, by having the receiving entity transmit the HARQ response at the defined time following the data transmission, the transmitting entity could understand that a HARQ response received from the receiving entity at that defined time corresponds with the transmission at issue, so that the transmitting entity can then proceed as necessary.

In addition, the transmitting entity may be configured to engage in re-transmission or a next data transmission at a defined time following the receiving entity's transmission of a HARQ response. This time may be set to allow sufficient time for the transmitting entity to process the received HARQ response (or detect absence of such a response) and to prepare for re-transmission or a next data transmission.

Further, in a representative implementation, the transmitting and receiving entities may be configured to allow up to a maximum number of HARQ re-transmissions for a given data transmission. For instance, the maximum number might be set in a range of zero (meaning that no HARQ re-transmission is allowed) to eight (meaning that eight re-transmissions could occur).

OVERVIEW

While the above re-transmission process can work well in practice, complexity can arise in a scenario where the transmitting and receiving entities communicate with each other over a time division duplex (TDD) channel, such as a TDD carrier for instance. Such a channel would be multiplexed over time between communications in either direction between the entities and would thus support transmission by the transmitting entity in only certain time intervals and transmission by the receiving entity in only other time intervals. For example, the channel may define a continuum of frames each divided into a defined sequence of subframes, with only certain subframes of the sequence supporting transmission in one direction between the entities and other subframes per frame supporting transmission in the other direction between the entities.

Depending on the specific sequence defined by the TDD channel, the time that passes after the transmitting entity provides a data transmission until the receiving entity provides a corresponding HARQ response could vary based on which time interval in the sequence the transmitting entity provides the data transmission in.

In particular, if we assume that the wait for HARQ transmission after the data transmission should be at least a defined minimum duration to facilitate processing and HARQ transmission or the like as noted above, then once that minimum duration passes, there could be an additional wait until the TDD channel defines its next time interval for carrying transmissions from the receiving entity to the transmitting entity. Assuming the TDD configuration does not alternate evenly back and forth between the two directions of transmission, this added wait on top of the minimum duration could then vary based on which time interval the data transmission occurred in.

For certain types of communications, the delay resulting from this HARQ process can be problematic. In particular, certain types of communications may tolerate no more than a defined maximum end-to-end delay. Yet the HARQ process can be a significant delay factor, especially when data transmission occurs in a time interval that has a relatively long associated wait for HARQ response transmission as discussed above. Further, this issue can be compounded if multiple re-transmissions are allowed for a given data transmission.

Disclosed herein is a method and system to help address this issue. In accordance with the disclosure, when data is to be transmitted from a transmitting entity to a receiving entity, the transmission will be scheduled to occur in a time interval that selected based on a consideration of the delay-sensitivity of the data and based on a HARQ delay associated with the selected time interval. For instance, if the data is particularly delay-sensitive, then the transmission could be scheduled to occur in a time interval that is selected based on the time interval having a relatively low associated HARQ delay, so as to help reduce the overall delay of the communication. Whereas, if the data is not particularly delay-sensitive, then the transmission could be scheduled to occur in a time interval that has a relatively high associated HARQ delay.

Accordingly, in one respect, disclosed is a method for controlling transmission of data over an air interface between a transmitting entity and a receiving entity, where the air interface has a TDD configuration defining a recurring sequence of time intervals, and where each time interval has a corresponding acknowledgement delay that defines a delay until transmission of an acknowledgement for data transmitted in the time interval. In accordance with the disclosure, the method includes determining a delay-sensitivity of data to be transmitted over the air interface from the transmitting entity and the receiving entity. And the method includes selecting one of the time intervals in which to configure transmission of the data, with the selecting being based at least on both the determined delay-sensitivity data and the acknowledgement delay of the selected time interval. In turn, the method then includes causing the data to be transmitted over the air interface in the selected time interval.

Further, disclosed is a method for controlling transmission of data over an air interface between a base station and a wireless client device (WCD) served by the base station, where the air interface has a TDD configuration defining a recurring sequence of downlink and uplink subframes, and where each subframe of the recurring sequence has a corresponding acknowledgement delay that defines a delay until transmission of an acknowledgement for data transmitted in the subframe. In accordance with disclosure, the method includes determining a delay-sensitivity of data to be transmitted over the air interface between the base station and the WCD. Further, the method includes selecting one of the subframes in which to configure transmission of the data, with the selecting being based at least on both the determined delay-sensitivity data and the acknowledgement delay of the selected subframe. And in turn, the method includes causing the data to be transmitted over the air interface in the selected subframe.

Still further, disclosed is a base station configured to control transmission of data over an air interface between the base station and a WCD served by the base station, where the air interface has a TDD configuration defining a recurring sequence of downlink and uplink subframes, and where each subframe of the recurring sequence has a corresponding acknowledgement delay that defines a delay until transmission of an acknowledgement for data transmitted in the subframe. As disclosed, the base station includes an antenna structure for transmitting and receiving communications over the air interface. And the base station includes a controller having a processing unit programmed to carry out operations comprising (a) determining a delay-sensitivity of data to be transmitted over the air interface between the base station and the WCD, (b) selecting one of the subframes in which to configure transmission of the data, the selecting being based at least on both the determined delay-sensitivity data and the acknowledgement delay of the selected subframe, and (c) causing the data to be transmitted over the air interface in the selected subframe.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 2 is a depiction of example TDD configurations.

FIG. 3 is the depiction of FIG. 2 supplemented with example delay values per subframe and with example uplink latency measures per TDD configuration.

FIG. 4 is a flow chart depicting operations that can be carried out in accordance with the disclosure.

DETAILED DESCRIPTION

The operations described herein can be carried out with respect to transmissions over a TDD air interface that is compliant with any of a variety of air interface protocols, where there is a varying HARQ response delay depending on the transmission interval in which data transmission occurs.

Without limitation, a good example of this situation arises with HARQ messaging on a TDD channel defined under the Long Term Evolution (LTE) protocol, typically used for air interface communication between a base station (e.g., LTE evolved Node-B (eNodeB)) and WCDs served by the base station. Operations will therefore be described by way of example in that context. However, it will be understood that the principles disclosed can extend to apply in other scenarios as well, such as with respect to other air interface protocols. Further, even within the context of LTE, numerous variations from the details disclosed may be possible. For instance, elements, arrangements, and operations may be added, removed, combined, distributed, or otherwise modified. In addition, operations described as being performed by one or more entities may be implemented in various ways, such as by a processing unit executing program instructions for instance.

Figure 1:
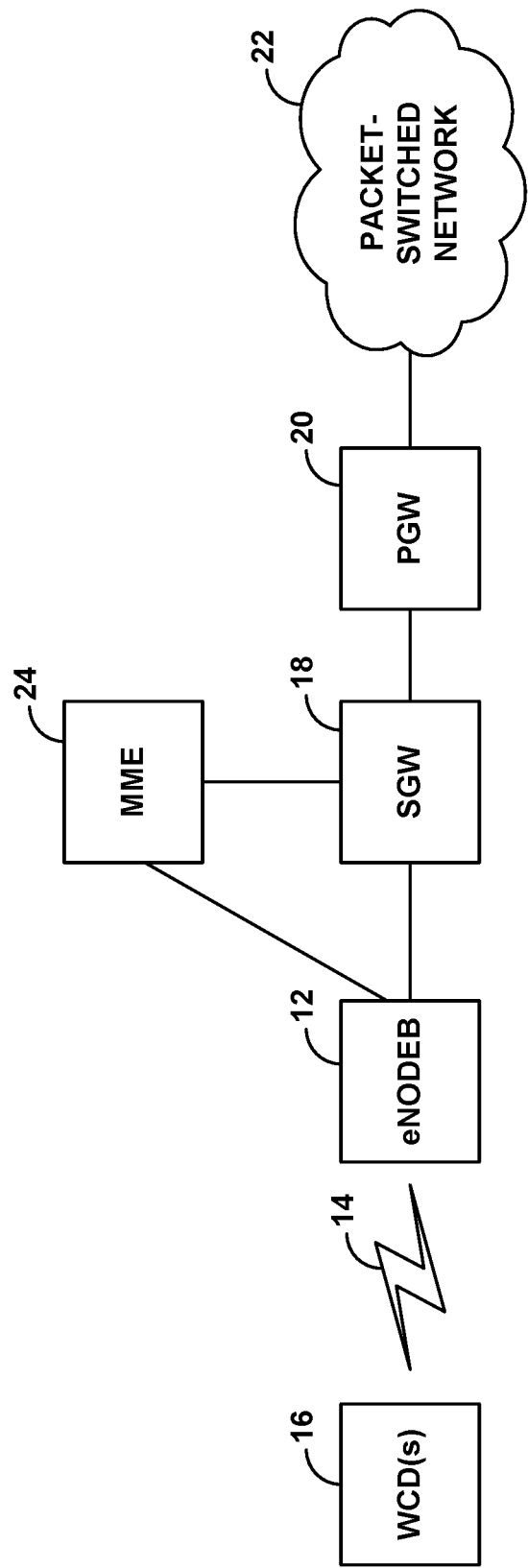
FIG. 1 is a simplified block diagram of an example wireless communication system in which features of the present disclosure can be implemented.

As noted above, FIG. 1 is a simplified block diagram of a representative LTE network. As shown, the network includes an eNodeB 12 (e.g., macro base station or small cell base station), which would include an antenna structure and associated equipment for providing an LTE coverage area 14 defining an LTE air interface over which to serve WCDs (e.g., cell phones, tracking devices, embedded wireless modules, or other wirelessly-equipped devices) such as a representative WCD 16. The eNodeB 12 is then interfaced with a serving gateway (SGW) 18, which is in turn interfaced with a packet-data-network gateway (PGW) 20 that provides connectivity with a packet-switched transport network 22 such as the Internet. Further, the eNodeB is also interfaced with a mobility management entity (MME) 24, which also interfaced with the SGW.

In practice, when a WCD such as WCD 16 first enters into coverage of the eNodeB, the WCD and eNodeB may engage in signaling to establish a radio-link-layer connection and to register the WCD of service. In this process, the MME may coordinate establishment for the WCD of one or more bearers defining logical communication tunnels extending between the WCD and the PGW, for carrying data communications between the WCD and the packet-switched transport network. Further, at various times while the eNodeB is serving the WCD, the MME may manage the WCD's bearers, such as by coordinating establishment of one or more other bearers or tearing down particular bearers. In addition, the eNodeB may maintain a context record indicting the bearers(s) currently established for the WCD.

Each such bearer established for the WCD may have an associated quality of service class indicator (QCI) value that indicates a quality of service class of the bearer. The QCI value of a bearer can define how the eNodeB and other network entities should handle data communicated on the bearer. For instance, the QCI value may correspond with a minimum guaranteed bit rate at which data transmitted on the bearer should be sent, so as to help meet certain delay budgets. A representative implementation of LTE defines QCI values 1 through 9, with QCI values 1-4 providing for various guaranteed bit rate (GBR) for particular types of data communications, and with QCI values 5-9 providing for best-effort (non-GBR) communication. Each of these QCI values (QCI levels) may thus correspond with data communication that has a particular delay budget or delay-sensitivity. For example, a QCI 1 may be for the most delay-sensitive data that is the most delay-sensitive, and QCI 9 may be for the least delay-sensitive data.

In LTE, the air interface is defined on a carrier having a defined frequency bandwidth (e.g., 3 MHz, 5 MHz, 10 MHz, 15 MHz, or 20 MHz). Further, the LTE air interface can be TDD, time division multiplexed between downlink communication in the direction from the eNodeB to the WCD and uplink communication in the direction from the WCD to the eNodeB.

In particular, the TDD LTE air interface defines a continuum of 10-millisecond (ms) frames, each divided into a sequence of ten 1-ms subframes or transmission time intervals, with the subframes of the sequence being multiplexed among downlink and uplink communication in accordance with a defined TDD configuration or frame configuration. Specifically, according to the TDD configuration, each of the ten subframes per TDD LTE frame could be designated as either a downlink subframe (D), an uplink subframe (U), or a special subframe (S). A downlink subframe would support communication from the eNodeB to WCDs, an uplink subframe would support communication from WCDs to the eNodeB, and a special subframe would have both downlink and uplink portions to help facilitate transition from downlink communication to uplink communication.

LTE supports several different TDD configurations, any one of which could be configured for use in practice. FIG. 2 is a table showing these TDD configurations as TDD configurations 0 through 6, with each TDD configuration multiplexing subframes 0 through 9 per frame among downlink, uplink, and special-subframe use. For example, the table illustrates TDD configuration #2 defining subframe sequence DSUDDDSUDD, and the table illustrates TDD configuration #3 defining subframe sequence DSUUUDDDDD.

An eNodeB will be configured to use one of these TDD configurations and to broadcast to any served WCDs an indication of which TDD configuration is in use, so that the eNodeB and its served WCD(s) will both know the TDD configuration and can operate accordingly.

When an eNodeB is serving a WCD, the eNodeB controls scheduling of both downlink and uplink data transmission in these subframes. In particular, when the eNodeB receives packet data from the SGW for transmission to the WCD on a particular bearer, the eNodeB selects a subframe in which to transmit the data to the WCD, and the eNodeB then transmits the data to the WCD in that subframe. And when the WCD has data to transmit to the eNodeB on a particular bearer, the WCD sends to the eNodeB a scheduling request for transmission of the data on that bearer, the eNodeB selects a subframe in which the WCD should transmit the data to the eNodeB, and the WCD then transmits the data to the eNodeB in that subframe.

LTE also supports HARQ processing in this arrangement, both for downlink data transmission (with HARQ response transmitted uplink) and for uplink data transmission (with HARQ response transmitted downlink). In particular, a representative implementation of LTE provides that when data transmission occurs in a given subframe, a HARQ response would then be transmitted in the next available subframe that is at least 4 subframes later (i.e., at least 4 ms later). For downlink data transmission, the WCD could transmit such a HARQ response on an uplink control channel, and for uplink data transmission, the eNodeB could transmit such a HARQ response on a downlink control channel. Further, at least a current implementation of LTE provides that the uplink portion of a special subframe is not usable to carry a HARQ response, but the downlink portion of a special subframe is usable to carry a HARQ response.

With this arrangement, the time that passes after the transmitting entity (e.g., eNodeB or WCD) provides a data transmission until the receiving entity (e.g., WCD or eNodeB) provides its corresponding HARQ response could vary based on which subframe of the TDD LTE channel the transmitting entity provides the data transmission in, and thus which subframe the eNodeB selects to schedule the data transmission in.

For instance, considering TDD configuration #1, if downlink data transmission from an eNodeB to a WCD occurs in subframe #0, the eNodeB would expect to receive a HARQ response from the WCD in subframe #7 of the same frame, i.e., with a delay of 7 ms, since that is the first uplink HARQ transmission opportunity that is at least 4 subframes after the data transmission. Whereas, if downlink data transmission from an eNodeB to a WCD occurs in subframe #9 of the same TDD configuration, the eNodeB would expect to receive a HARQ response from the WCD in subframe #3 of the next frame, i.e., with a delay of just 4 ms, since that is the first uplink HARQ transmission opportunity that is at least 4 subframes after the data transmission.

Likewise, for uplink transmission, also considering TDD configuration #1, if data transmission from a WCD to the eNodeB occurs in subframe #8, the WCD would expect to receive a HARQ response from the eNodeB in subframe #4 of the next frame, i.e., with a delay of 6 ms, since that is the first downlink HARQ transmission opportunity that is at least 4 subframes after the data transmission. Whereas, if uplink data transmission from a WCD to the eNodeB occurs in the uplink portion of special subframe #2, the WCD would expect to receive a HARQ response from the eNodeB in subframe #6 of the same subframe, i.e., with a delay of just 4 ms, since that is the first downlink HARQ transmission opportunity that is at least 4 subframes after the data transmission.

In accordance with LTE, once the receiving entity (WCD or eNodeB) sends a HARQ response to the transmitting entity (eNodeB or WCD), the transmitting entity then either engages in a re-transmission or sends a next data transmission if appropriate. Further, in either case, the transmitting entity may wait at least a defined time following receipt of the HARQ response (or detecting absence of an expected HARQ response) before doing so. In particular, LTE provides that the transmitting entity would engage in re-transmission or a next data transmission in a subframe that is then at least 4 subframes later (i.e., at least 4 ms later).

In addition, in certain LTE implementations or for certain types of communications, an eNodeB and a served WCD may be configured to allow up to a defined maximum number of HARQ re-transmissions for a given data transmission. For instance, the maximum number could be anywhere from zero (meaning that no HARQ re-transmission is allowed) to eight (meaning that eight re-transmissions could occur).

In view of the foregoing, it follows that the overall delay resulting from the HARQ process can vary greatly in some implementations depending on the LTE subframe in which the transmitting entity provides its data transmission, and thus which subframe the eNodeB selects to schedule the data transmission in. At a minimum, for instance, the delay until a transmission of a HARQ response corresponding with that data transmission can vary. Further, if there are repeated re-transmissions, that delay could be compounded.

As noted above, this delay from the HARQ process can be particularly troubling for certain types of data communications. In particular, the delay could be especially troubling for delay-sensitive communications such as voice over Internet Protocol (VoIP) call communications, streaming video communications, gaming communications, and the like.

By way of example, when two people are engaged in a VoIP call with each other, the end-to-end tolerable delay from one person talking to the other person hearing may be about 200 ms. Assuming that each person is using an LTE WCD served by a respective eNodeB, factors that contribute to this delay include (i) the air interface delay on each end and (ii) the network delay for transmission between the eNodeBs. If we assume that the network transmission delay between the eNodeBs is about 30 ms, that would then leave on average about 85 ms of tolerable air interface delay for each participating WCD. For data transmissions in certain LTE TDD subframes, however, the associated HARQ transmission delay may be particularly long, and repeated HARQ re-transmissions with such delay could cumulatively exceed the tolerable 85 ms air interface delay, thus leading to poor user experience.

FIG. 3 helps illustrate how this could play out in practice for downlink LTE transmissions, for TDD frame configurations (FCs) #1 through #5 by way of example.

The top table in FIG. 3 depicts the HARQ acknowledgement delay, K, respectively for each subframe that supports downlink data transmission (each downlink subframe or special subframe). In particular, for each such subframe, the table shows how many subframes (and thus how many milliseconds) there would be after downlink data transmission in that subframe, before the next uplink HARQ opportunity that is at least 4 ms after the downlink data transmission. For instance, in line with the discussion above for TDD frame configuration #1, the table shows a K value of 7 ms for downlink data transmission in subframe #0, and the table shows a K value of 4 ms for downlink data transmission in subframe #9. Further, for each of the illustrated TDD frame configurations, the table shows an average K value. For instance, for TDD frame configuration #1, the table shows an average K value of 6 ms.

The bottom table in FIG. 3 then depicts what the total HARQ delay would be (at a minimum) on average for each TDD frame configuration, for various different numbers of HARQ re-transmissions, accounting for the 4 ms of delay until re-transmission after receiving a HARQ NACK (or detecting absence of an expected HARQ response). For instance, for TDD frame configuration #1, the table shows that for zero HARQ re-transmissions, there would be a delay of 10 ms, which is the average 6 ms HARQ response delay shown in the top table plus at least 4 ms of delay until re-transmission or next data transmission following HARQ response. And for the same TDD frame configuration, the table shows that for one HARQ re-transmission, there would be a delay of 20 ms, which is the same 10 ms just described plus another 10 ms to account for an additional HARQ response and then a re-transmission.

As highlighted in the bottom table of FIG. 3, in several of these scenarios (particular TDD frame configurations with sufficient number of HARQ re-transmissions, the total resulting delay exceeds the tolerable 85 ms air interface delay. Consequently, at least these scenarios could lead to undesirable delay and associated user-experience problems for delay-sensitive data communication such as VoIP call communication.

As noted above, one way to help address this problem is by configuring data transmission to occur in subframes that are intentionally selected based on consideration of the delay-sensitivity of the data at issue and based on the associated HARQ acknowledgement delay of the selected subframe. In particular, a determination can be made that the data communication at issue is particularly delay-sensitive, and in response, a subframe can then be selected based on the subframe having a relatively low acknowledgement delay, and the data communication can be scheduled to occur in that selected subframe. As a result, the process can thereby help to minimize at least the HARQ associated delay in the data communication.

In the LTE implementation, the eNodeB could carry out this process, as the eNodeB controls which subframes are allocated for downlink and uplink data communication between the eNodeB and the WCD.

In practice, when the eNodeB is faced with a need to schedule transmission of data to or from a WCD, the eNodeB could determine a level of delay-sensitivity of the data. By way of example, the eNodeB could consider the QCI level of the bearer on which the data transmission is to occur and could deem the QCI level to represent the delay-sensitivity. (For instance, as noted above, QCI 1 could be the most delay-sensitive, and QCI 9 could be the least delay-sensitive.) As another example, the eNodeB could engage in deep-packet-inspection to evaluate data packet content so as to determine the type of data communication and could map that determined type to a predefined typical delay sensitivity (e.g., VoIP communication being highly delay sensitive, but e-mail communication being not particularly delay sensitive). Other examples are possible as well.

Given the determined delay-sensitivity of the data being communicated, the eNodeB could then select a subframe in which to schedule the data transmission. In practice, for instance, the eNodeB could consider the various candidate subframes of the TDD frame configuration in effect, namely, those subframes that support data transmission in the direction at issue. (If the data transmission is downlink, the eNodeB could consider each D subframe and each S subframe; whereas, if the data transmission is uplink, the eNodeB could consider each U subframe and each S subframe.) And the eNodeB could identify a proper subset (i.e., less than all) of those subframes that each have a HARQ response delay (acknowledgement delay) no greater than a defined threshold HARQ response delay and then select a subframe from the proper subset in which to schedule the data transmission.

The threshold HARQ response delay against which the eNodeB compares the HARQ response delay of each candidate subframe could be established in various ways.

As one example, the eNodeB could apply a predefined threshold HARQ response delay, such as the average K value shown in FIG. 3, and the eNodeB could do so in response to determining that the determined delay-sensitivity of the data communication at issue is at least as high as a predefined threshold delay-sensitivity (perhaps being a GBR QCI level, or perhaps being QCI 1, or the like). With this implementation, the eNodeB could schedule the data transmission in a subframe provided that the subframe's associated HARQ response delay is no greater than the average K value.

FIG. 4 is a variation of FIG. 3, showing how this can play out in practice for TDD frame configurations #1 through #5 by way of example.

The top table in FIG. 4 depicts an "X" in each subframe whose associated HARQ response delay is greater than the average K value for the associated TDD frame configuration, to indicate that those subframes would be eliminated from consideration on grounds that their associated HARQ response delay would be too high. The top table then shows that the result of eliminating those subframes from consideration is that the average HARQ response delay per TDD frame configuration is reduced.

In turn, the lower table in FIG. 4 shows that average total HARQ delay (at a minimum) for each TDD frame configuration would be reduced. And the lower table then further shows fewer highlighted scenarios where the total resulting delay would exceed the tolerable 85 ms air interface delay, for the VoIP example. Thus, the table illustrates that by the eNodeB intentionally selecting a subframe based on the subframe having threshold low HARQ response delay (or not having threshold high HARQ response delay), the eNodeB could help minimize overall communication delay.

As another example, rather than using a fixed HARQ response delay threshold for comparison, the eNodeB could select the HARQ response delay threshold based on the determined delay-sensitivity of the data communication at issue. By way of example, each QCI level could have an associated HARQ response delay threshold (e.g., a lower such threshold for a QCI level with a lower delay-budget, so as to require less HARQ response delay in order to help minimize overall delay). Based on the QCI level of the data communication at issue, the eNodeB could then determine or establish the HARQ response delay threshold to apply and may select a subframe based on the subframe having a HARQ response delay that is no greater than that determined or established HARQ response delay threshold. In addition, the eNodeB could take into account the maximum allowed number of HARQ re-transmissions for the data communication at issue, as the greater such number, the more need there may be to avoid certain subframes that relatively high HARQ response delays. Other examples may be possible as well.

Figure 5:
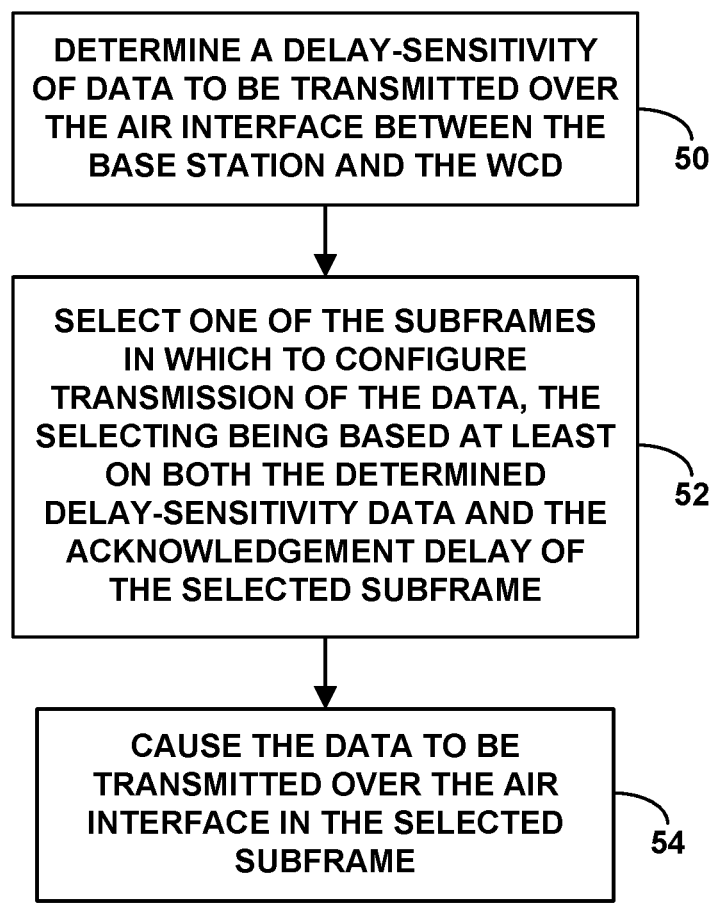
FIG. 5 is another flow chart depicting operations that can be carried out in accordance with the disclosure.

FIG. 5 is next a flow chart depicting a method that can be carried out in accordance with this process, in a representative TDD LTE scenario, to control transmission of data over an air interface between a base station and a WCD served by the base station, where the air interface has a TDD configuration defining a recurring sequence of downlink and uplink subframes, and where each subframe of the recurring sequence has a corresponding acknowledgement delay that defines a delay until transmission of an acknowledgement (e.g., HARQ ACK or NACK) for data transmitted in the subframe.

As shown in FIG. 5, at block 50, the method includes determining a delay-sensitivity of data to be transmitted over the air interface between the base station and the WCD. At block 52, the method then includes selecting one of the subframes in which to configure transmission of the data, the selecting being based at least on both the determined delay-sensitivity data and the acknowledgement delay of the selected subframe. And at block 54, the method includes causing the data to be transmitted over the air interface in the selected subframe.

In line with the discussion above, the data could be data to be transmitted downlink over the air interface between the base station and the WCD, and the sequence could include multiple downlink subframes, in which case the act of selecting of one of the subframes could involve selecting from among the multiple downlink subframes of the sequence. And in this scenario, the act of causing the data to be transmitted over the air interface in the selected subframe could involve the base station transmitting the data over the air interface in the selected subframe.

Alternatively, the data could be data to be transmitted uplink over the air interface between the base station and the WCD, and the sequence could include multiple uplink subframes, in which case the act of selecting of one of the subframes could involve selecting from among the multiple uplink subframes of the sequence. And in this scenario, the act of causing the data to be transmitted over the air interface in the selected subframe could involve the base station transmitting to the WCD in advance of the selected subframe a scheduling-directive that directs the WCD to transmit the data over the air interface in the selected subframe.

Further, as discussed above, the act of selecting the subframe could involve identifying a proper subset of the subframes of the sequence based on each subframe of the proper subset having an acknowledgement delay that is no higher than a threshold acknowledgement delay, and selecting the subframe from the identified proper subset of subframes. For instance, this could involve determining that the determined delay-sensitivity of the data is at least as high as a predefined threshold delay-sensitivity and then, in response to the determining, carrying out the identifying of the proper subset and the selecting from the identified proper subset, possibly with the threshold acknowledgement delay being predefined as discussed above. Alternatively, this could involve establishing the threshold acknowledgement delay based at least on the determined delay-sensitivity of the data, and applying the established threshold acknowledgement delay.

Figure 6:
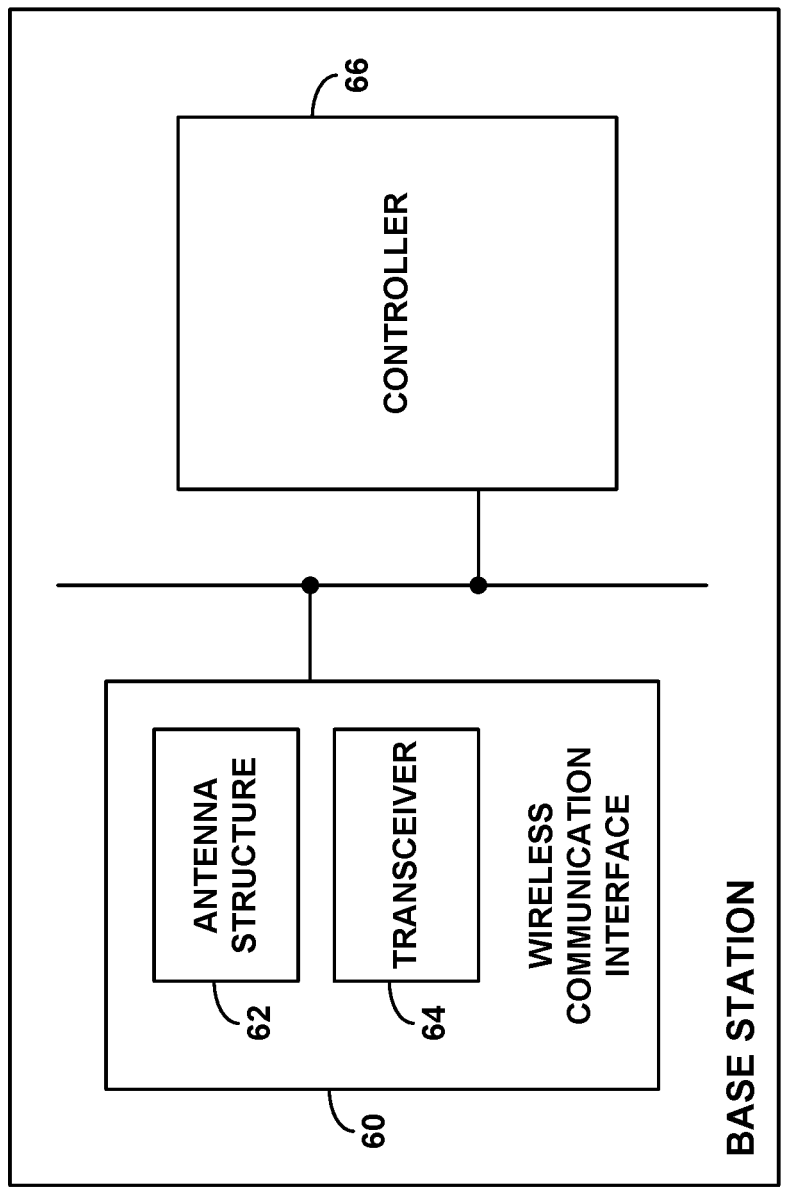
FIG. 6 is a simplified block diagram of a base station operable in accordance with the disclosure.

Finally, FIG. 6 is a simplified block diagram of a base station that could be configured to operate in accordance with the present disclosure, to control transmission of data over an air interface between the base station and a WCD served by the base station, where the air interface has a TDD configuration defining a recurring sequence of downlink and uplink subframes, and where each subframe of the recurring sequence has a corresponding acknowledgement delay that defines a delay until transmission of an acknowledgement for data transmitted in the subframe.

This base station could take various forms, examples of which include a macro base station, a small cell base station, a repeater, or the like. As shown in FIG. 6, the base station includes a wireless communication interface 60 comprising an antenna structure 62 and transceiver 64 that are cooperatively configured to provide a cell in which to serve WCDs. In line with the discussion above, the cell operates with TDD configuration defining a recurring sequence of downlink and uplink subframes for communication between the base station and one or more WCDs that would operate in the cell, where each subframe has a corresponding acknowledgement delay that defines a delay until transmission of an acknowledgement for data transmitted in the subframe.

Further, the base station includes a controller (e.g., a processing unit, non-transitory data storage, and program instructions stored in the data storage and executable by the processor) 56, possibly integrated with the wireless communication interface, which is operable to carry out features such as those noted above. In particular, by way of example, the controller could operate to (a) determine a delay-sensitivity of data to be transmitted over the air interface between the base station and the WCD, (b) select one of the subframes in which to configure transmission of the data, the selecting being based at least on both the determined delay-sensitivity data and the acknowledgement delay of the selected subframe, and (c) cause the data to be transmitted over the air interface in the selected subframe.

Various features discussed above can be applied in this context as well.

Exemplary embodiments have been described. Those skilled in the art will understand, however, that changes and modifications may be made to these embodiments without departing from the true scope and spirit of the invention. For example, while the above discussion focuses on wireless communications, the features described could be applied to control transmission of data from a transmitting entity to a receiving entity over other types of TDD communication channels as well.

We claim:

1. A method for controlling transmission of data over a time division duplex (TDD) channel from a transmitting entity to a receiving entity, wherein the TDD channel defines a recurring sequence of time intervals, and wherein each time interval has a corresponding acknowledgement delay that defines a delay until transmission of an acknowledgement for data transmitted in the time interval, the method comprising:
   determining a delay-sensitivity of data to be transmitted over the TDD channel from the transmitting entity and the receiving entity;
   selecting one of the time intervals in which to configure transmission of the data, the selecting being based at least on both the determined delay-sensitivity of the data and the acknowledgement delay of the selected time interval; and
   causing the data to be transmitted over the TDD channel in the selected time interval.

2. A method for controlling transmission of data over an air interface between a base station and a wireless client device (WCD) served by the base station, wherein the air interface has a time division duplex (TDD) configuration defining a recurring sequence of downlink and uplink subframes, and wherein each subframe of the recurring sequence has a corresponding acknowledgement delay that defines a delay until transmission of an acknowledgement for data transmitted in the subframe, the method comprising:
   determining a delay-sensitivity of data to be transmitted over the air interface between the base station and the WCD;
   selecting one of the subframes in which to configure transmission of the data, the selecting being based at least on both the determined delay-sensitivity of the data and the acknowledgement delay of the selected subframe; and
   causing the data to be transmitted over the air interface in the selected subframe.

3. The method of claim 2, wherein the data is to be transmitted downlink over the air interface between the base station and the WCD, wherein the sequence includes multiple downlink subframes, and wherein the selecting of one of the subframes is selecting from among the multiple downlink subframes of the sequence.

4. The method of claim 2, wherein the data is to be transmitted uplink over the air interface between the base station and the WCD, wherein the sequence includes multiple uplink subframes, and wherein the selecting of one of the subframes is selecting from among the multiple uplink subframes of the sequence.

5. The method of claim 2, wherein determining the delay-sensitivity of the data to be transmitted over the air interface between the base station and the WCD comprises determining a quality of service class indicator (QCI) level of the data.

6. The method of claim 2, wherein selecting the subframe comprises:
   identifying a proper subset of the subframes of the sequence based on each subframe of the proper subset having an acknowledgement delay that is no higher than a threshold acknowledgement delay; and
   selecting the subframe from the identified proper subset of subframes.

7. The method of claim 6, wherein selecting the subframe based at least on both the determined delay-sensitivity of the data and the acknowledgement delay of the selected subframe comprises:
   determining that the determined delay-sensitivity of the data is at least as high as a predefined threshold delay-sensitivity; and
   carrying out the identifying of the proper subset and the selecting from the identified proper subset in response to the determining.

8. The method of claim 7, wherein the threshold acknowledgement delay is predefined.

9. The method of claim 8, wherein the threshold acknowledgement delay is an average of the acknowledgement delays of the subframes of the sequence.

10. The method of claim 6, wherein selecting the subframe based at least on both the determined delay-sensitivity of the data and the acknowledgement delay of the selected subframe comprises:
    based at least on the determining delay-sensitivity of the data, establishing the threshold acknowledgement delay,
    wherein the identifying of the proper subset is based on each subframe of the proper subset having an acknowledgement delay that is no higher than the established threshold acknowledgement delay.

11. The method of claim 2, carried out by the base station, wherein the data is to be transmitted downlink or uplink over the air interface, and
    wherein (a) if the data is to be transmitted downlink over the air interface, then causing the data to be transmitted over the air interface in the selected subframe comprises the base station transmitting the data over the air interface in the selected subframe and (b) if the data is to be transmitted uplink over the air interface, then causing the data to be transmitted over the air interface in the selected subframe comprise the base station transmitting to the WCD in advance of the selected subframe a scheduling-directive directing the WCD to transmit the data over the air interface in the selected subframe.

12. The method of claim 2, wherein the acknowledgement is a hybrid automatic repeat request (HARQ) message selected from the group consisting of a positive-acknowledgement (ACK) and a negative-acknowledgement (NACK).

13. A base station configured to control transmission of data over an air interface between the base station and a wireless client device (WCD) served by the base station, wherein the air interface has a time division duplex (TDD) configuration defining a recurring sequence of downlink and uplink subframes, and wherein each subframe of the recurring sequence has a corresponding acknowledgement delay that defines a delay until transmission of an acknowledgement for data transmitted in the subframe, the base station comprising:

an antenna structure for transmitting and receiving communications over the air interface; and a controller including a processing unit programmed to carry out operations comprising (a) determining a delay-sensitivity of data to be transmitted over the air interface between the base station and the WCD, (b) selecting one of the subframes in which to configure transmission of the data, the selecting being based at least on both the determined delay-sensitivity of the data and the acknowledgement delay of the selected subframe, and (c) causing the data to be transmitted over the air interface in the selected subframe.

14. The base station of claim 13, wherein determining the delay-sensitivity of the data to be transmitted over the air interface between the base station and the WCD comprises determining a quality of service class indicator (QCI) level of the data.

15. The base station of claim 13, wherein selecting the subframe comprises:

identifying a proper subset of the subframes of the sequence based on each subframe of the proper subset having an acknowledgement delay that is no higher than a threshold acknowledgement delay; and selecting the subframe from the identified proper subset of subframes.

16. The base station of claim 15, wherein selecting the subframe based at least on both the determined delay-sensitivity of the data and the acknowledgement delay of the selected subframe comprises:

determining that the determined delay-sensitivity of the data is at least as high as a predefined threshold delay-sensitivity; and carrying out the identifying of the proper subset and the selecting from the identified proper subset in response to the determining.

17. The base station of claim 16, wherein the threshold acknowledgement delay is predefined.

18. The base station of claim 15, wherein selecting the subframe based at least on both the determined delay-sensitivity of the data and the acknowledgement delay of the selected subframe comprises:

based at least on the determining delay-sensitivity of the data, establishing the threshold acknowledgement delay, wherein the identifying of the proper subset is based on each subframe of the proper subset having an acknowledgement delay that is no higher than the established threshold acknowledgement delay.

19. The base station of claim 13, wherein the data is to be transmitted downlink or uplink over the air interface, and wherein (a) if the data is to be transmitted downlink over the air interface, then causing the data to be transmitted over the air interface in the selected subframe comprises causing the base station to transmit the data to the WCD via the antenna structure in the selected subframe and (b) if the data is to be transmitted uplink over the air interface, then causing the base station to transmit to the WCD via the antenna structure in advance of the selected subframe a scheduling-directive directing the WCD to transmit the data over the air interface in the selected subframe.

20. The base station of claim 13, wherein the acknowledgement is a hybrid automatic repeat request (HARQ) message selected from the group consisting of a positive-acknowledgement (ACK) and a negative-acknowledgement (NACK).

* * * * *